Sept. 20, 1971  TADASHI MOROKUMA  3,605,600

COMBINATION WARNING AND SHUTTER TIMING CIRCUIT

Filed Oct. 21, 1968

INVENTOR
TADASHI MOROKUMA

BY
ATTORNEY

United States Patent Office 3,605,600
Patented Sept. 20, 1971

3,605,600
COMBINATION WARNING AND SHUTTER TIMING CIRCUIT
Tadashi Morokuma, Tokyo, Japan, assignor to Olympia Optical Company, Ltd., Tokyo, Japan
Filed Oct. 21, 1968, Ser. No. 769,250
Claims priority, application Japan, Oct. 28, 1967, 42/69,276
Int. Cl. G03b 7/08
U.S. Cl. 95—10C
6 Claims

ABSTRACT OF THE DISCLOSURE

A camera shutter system having a control circuit capable of two operational modes. In one mode the control circuit responds to an A.C. signal that exceeds a threshold voltage representing excessive subject brightness as detected by a photoelectric device. The signal energizes a warning indicator. In a second mode the control circuit serves as a timing circuit which operates from a D.C. source for electromagnetically closing the camera shutter after a time constant interval dependent upon the circuit resistance of the subject monitoring photoelectric device.

BACKGROUND OF THE INVENTION

The present invention relates to a warning device for use in a shutter such as an electronic shutter capable of automatically controlling the exposure time thereof as a function of the scene brightness for the proper exposure for preventing the improper exposure by the shutter. The present invention also relates to a warning device for use in an electronic shutter for preventing the improper exposure by the shutter, wherein the elements incorporated in the electronic shutter are commonly utilized as those of the warning device.

A conventional electronic shutter comprises a D.C. source, a timing circuit consisting of a photoelectric element adapted to receive the light from the scene to thereby vary the resistance thereof in response to the scene brightness and a capacitor connected in series with the photoelectric element to the D.C. source, control means connected to the capacitor so as to be actuated at a predetermined set condition of the control means to produce an output relating to the scene brightness, and shutter actuating means operated by the output of the control means so that the shutter is closed for the proper exposure time after the shutter is opened and the capacitor is charged by the D.C. source through the photoelectric element.

Since the photoelectric element such as a CdS cell and the capacitor connected in series thereto form a timing circuit and the resistance of the photoelectric element varies substantially in inverse proportion to the light intensity incident thereto, the terminal voltage of the capacitor is raised in accordance with a time constant which is the product of the resistance of the photoelectric element and the capacity of the capacitor. Therefore, the time in which the terminal voltage of the capacitor reaches a predetermined value after the capacitor has begun to be charged through the photoelectric element is proportional to the resistance of the photoelectric element. Thus, the higher the intensity of the light incident to the photoelectric element, the shorter the time of charging the capacitor to the predetermined value of the terminal voltage and vice versa.

Therefore, if the shutter is opened at the same time as the charging of the capacitor commences and the shutter is closed by means of a control means connected to the capacitor at the time the terminal voltage of the capacitor reaches the predetermined value, the proper exposure time is obtained as a function of the scene brightness by appropriately selecting the predetermined value.

In such an electronic shutter, however, has the following disadvantages:

(1) Since the resistance of a photoelectric element does not vary exactly in inverse proportion to the light quantity which is received by the photoelectric element, insufficient exposure for the darker scene brightness will result when the shutter is adjusted so that the proper exposure is obtained at the higher scene brightness whereas overexposure will result for the higher scene brightness when the shutter is adjusted to effect the proper exposure for the darker scene brightness.

(2) The shutter speed is limited to about $1/1000$ sec. at the highest for the reason of the mechanical construction thereof. In the actual operation of the shutter, however, it is often required to set the shutter speed higher than that permitted to the shutter because of the sensitivity of the film used or the inadequate setting of the diaphragm opening. In case indicating means is provided for indicating the fact that the required shutter speed exceeds the range of the shutter speed allowed to the shutter under the particular picture taking condition, the diaphragm opening may be reset for the proper exposure by the shutter. However, such an indication cannot be obtained in an electronic shutter as described above, so that improper exposures might result which can only be found out after the development of the film.

(3) When the scene brightness is low, a shutter speed such as lower than $1/30$ sec. might be required which will cause the fluctuation of the shutter during the exposure thereof. In such a case, the diaphragm opening must be result to a greater opening so that the higher shutter speed is used for the proper exposure. In an electronic shutter, however, the proper exposure time can only be determined after the shutter is opened so as to sence the scene brightness by means of the photoelectric element. Therefore, the need for resetting of the diaphragm opening for the proper exposure time cannot be given to the operator prior to the actuation of the shutter thereby resulting in improper exposures due to the fluctuation of the shutter during the actuation thereof.

Therefore, it is advisable to provide a warning device for avoiding the above described disadvantages and insuring the proper exposure by the shutter by indicating the operator the improper condition of the shutter for the proper exposure prior to the operation of the shutter or by arresting the shutter under the improper condition thereof for the proper exposure.

A warning device has been proposed by the applicant which utilizes an electric circuit consisting of a photoelectric element and a resistor as disclosed in Japanese Patent Publn. No. 11287/67. However, such a warning device requires a plurality of resistors to be replaced in the electric circuit each time the film of different sensitivity, is used, thereby making the warning device very expensive.

In the field of microscopic photography, there is no danger of vibration or fluctuation of the shutter during the exposure time due to the low intensity of the light from the object. And, at the same time, if the object is too dark for the proper exposure, such a condition can be detected by the operator prior to the operation of the shutter. Therefore, there is little danger of the failure of the exposure due to the lower brightness of the object.

The present invention aims at avoiding the above described disadvantages of the prior art shutter capable of automatically controlling the exposure time in response to the scene brightness and providing a novel and useful warning device for preventing the improper exposure of the shutter.

SUMMARY OF THE INVENTION

An object of the present invention is to provide a novel and useful warning device for use in a shutter capable of automatically controlling the exposure time thereof in accordance with the scene brightness for preventing the improper exposure.

Another object of the present invention is to provide a novel and useful warning device of the type described above which is used in an electronic shutter wherein the elements of the electronic shutter can be commonly utilized as those of the warning device thereby dispensing with additional elements and rendering the warning device to be made at lower cost.

Further object of the present invention is to provide a novel and useful warning device of the type described above which indicates to the operator the improper condition of the shutter for insuring the proper exposure to be effected by the operator.

Still further object of the present invention is to provide a novel and useful warning device of the type described above wherein the shutter is automatically prevented from being actuated under the improper condition of the shutter for the proper exposure.

Still further object of the present invention is to provide a novel and useful warning device of the type described above which is particularly useful in the microscopic photography.

The objects of the present invention is achieved in accordance with the present invention by providing a warning device for use in a shutter capable of automatically controlling the exposure time as a function of the scene brightness for the proper exposure, which comprises an A.C. source connected to a timing circuit of the warning device which consists of a photoelectric element adapted to receive the light from the scene and a capacitor connected in series with said photoelectric element in said timing circuit for impressing thereto A.C. voltage, control means connected between one of the terminals of the A.C. source and the junction between the photoelectric element and the capacitor so as to be operated by the voltage applied thereto as determined by the resistance of the photoelectric element which is variable in response to the variation in the scene brightness for generating an output, and actuating means connected to the control means so as to actuate warning means adapted to be connected to a D.C. source through the actuating means by virtue of the output of the control means thereby permitting a warning of the improper exposure by the shutter to be given by means of the warning means depending upon whether the resistance of the photoelectric element as determined by the scene brightness exceeds a predetermined critical value set in the warning device for preventing the improper exposure by the shutter.

The warning device of the present invention may comprise indicating means such as a lamp connected in series with the actuating means for warning the improper condition of the shutter for the proper exposure.

Further, the warning device of the present invention may comprise arresting means connected in series with the actuating means for preventing the shutter from being actuated for the improper exposure.

In accordance with a further feature of the present invention, the warning device is incorporated in an electronic shutter which comprises a D.C. source, a timing circuit connected to the D.C. source and consisting of a photoelectric element and a capacitor connected in series to the D.C. source, control means connected to the D.C. source and the junction between the photoelectric element and the capacitor for generating an output depending upon the resistance of the photoelectric element which is variable in response to the variation in the scene brightness and actuating means connected to the D.C. source in series with a shutter closing means and connected to the control means so as to be supplied with the output of the control means so that the shutter is closed by means of the shutter closing means after the shutter is opened and the timing circuit is actuated for operating the control means for providing a proper exposure time to the shutter, and the D.C. source, the controlling means and the actuating means are, respectively, utilized commonly as those of the warning device by switching the connection between either one of the terminals of the D.C. source and the timing circuit to one of the terminals of the A.C. source so as to complete the circuit including the A.C. source and the timing circuit and also by switching the circuit including the shutter closing means and the D.C. source so as to complete the circuit including the D.C. source and the warning means.

This construction makes the warning device very simple and economical.

As described above, the warning device of the present invention can be made compact in size and produced at low cost without substantially requiring additional elements to the conventional electronic shutter and is easy to operate.

DETAILED DESCRIPTION OF THE PREFERRED EMBODIMENTS

Prior to the description of the present invention, a conventional electronic shutter will be described with reference to FIG. 1 for the better understanding of the present invention.

Figure 1:
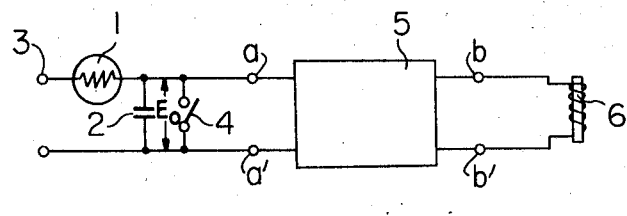
FIG. 1 is a schematic diagram showing a conventional electronic shutter.

In FIG. 1, a photoelectric element 1 and a capacitor 2 are connected in series to a D.C. source 3. A switch 4 is connected in paralled with the capacitor 2. A control means 5 is connected to the capacitor 2 at $a, a'$. The output side of the control means 5 is connected to a shutter closing means 6 such as an electromagnet at $b, b'$. The shutter closing means 6 is adapted to close the shutter when it is actuated by the control means 5. The switch 4 is opened at the same time the shutter is opened so as to permit the capacitor 2 to be charged by the D.C. source 3 through the photoelectric element 1.

The control means 5 is so constructed that it supplies an output thereof to the shutter closing means 6 when the terminal voltage of the capacitor 2 reaches a predetermined value $E_0$.

As described previously, the resistance of the photoelectric element 1 varies substantially in inverse proportion to the light intensity or light quantity incident to the photoelectric element 1 and the terminal voltage of the capacitor 2 rises at a rate determined by a time constant $\tau = RC$, wherein R is the resistance of the photoelectric element 1 and C is the capacity of the capacitor 2. Therefore, the time required to increase the terminal voltage of the capacitor 2 to a predetermined value $E_0$ becomes shorter as the intensity or the quantity of the light incident to the photoelectric element 1 becomes greater and vice versa, because the resistance of the photoelectric element 1 varies in accordance with the variation in the light incident thereto. Thus, when the switch 4 is opened simultaneously with the opening of the shutter so that the capacitor 2 is charged by the D.C. source 3, the terminal voltage of the capacitor 2 increases, and the control means 5 is actuated to operate the shutter closing means 6 so as to close the shutter when the terminal voltage of the capacitor 2 reaches the predetermined value $E_0$. The time period in which the shutter is opened as described above is a function of the scene brightness and gives a proper exposure for any given scene brightness.

As previously described, an electronic shutter as described above has several disadvantages.

Now, the present invention will be described hereinbelow with reference to FIGS. 2 and 3.

Figure 2:
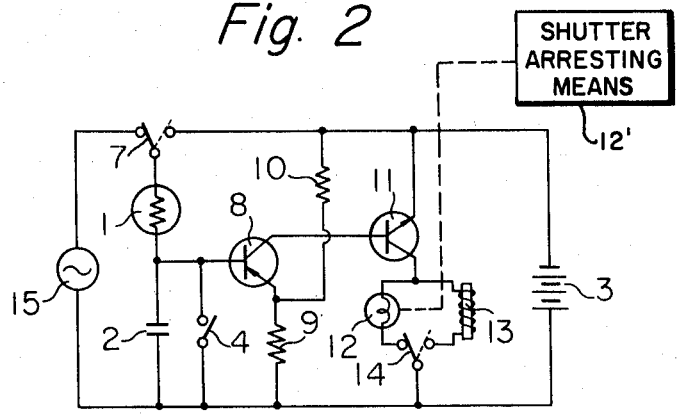
FIG. 2 is a diagram showing the electric circuit of an embodiment of the warning device incorporated in an electronic shutter constructed in accordance with the present invention.

FIG. 2 shows an embodiment of the warning device of the present invention. This embodiment includes a D.C. source 3, a photoelectric element 1 and a capacitor 2 connected in series. A switch 7 is provided in the line connecting the photoelectric element 1 to the D.C. source 3 for the reason described later. The base of a transistor 8 is connected to the junction between the photoelectric element 1 and the capacitor 2.

A switch 4 is connected in parallel with the capacitor 2.

The emitter of the transistor 8 is connected to the junction between a resistor 9 and a resistor 10, the opposite end of each of the resistors 9, 10 is connected to the respective terminal of the D.C. source 3. The circuit consisting of the transistor 8 and resistors 9, 10 constitutes the control means and the transistor 8 is rendered to be conductive when the base voltage is made greater in the negative sense than a reference voltage $E_0$ which is determined by the value of each of the resistors 9, 10 and the voltage of the D.C. source 3.

The collector of the transistor 8 is connected to the base of a further transistor 11 acting as the actuating means. The emitter and the collector of the transistor 11 are connected to the D.C. source 3 through a circuit consisting of a lamp 12 and an electromagnet 13 connected in parallel therewith and a switch 14. By operating the switch 14, either one of the lamp 12 and the electromagnet 13 can be connected in the circuit. The lamp 12 serves as a warning means while the electromagnet 13 serves as a shutter closing means.

When the transistor 8 is rendered to be conductive and electric current is applied therefrom to the base of the transistor 11, the current is magnified by the transistor 11 so that either one of the lamp 12 and the electromagnet 13 is energized depending upon the position of the switch 14.

In accordance with the characteristic feature of the present invention, an A.C. source 15 is provided in the circuit described above, one of the terminals of the A.C. source 15 being connected to the photoelectric element 1 through the switch 7, while the other terminal is connected to the side of the capacitor 2 opposite to that at which the capacitor 2 is connected to the photoelectric element 1.

The voltage of the A.C. source 15 is so selected that the peak voltage applied to the base of the transistor 8 from the A.C. source 15 reaches the critical value $E_0$ when the scene brightness exceeds the limits within which the shutter can operate for the proper exposure.

In operating the warning device as described above, the switches 7 and 14 are operated to assume the positions indicated by solid lines in FIG. 2.

When the switch 4 is opened, the A.C. current is applied to the photoelectric element 1 and the capacitor 2. The voltage applied to the base of the transistor 8 from the A.C. source 15 through the photoelectric element 1 varies depending upon the scene brightness. When the scene brightness exceeds the condition under which the above described critical value $E_0$ is applied to the base of the transistor 8, it is rendered to be conductive so that electric current is applied to the transistor 11 thereby permitting the latter to be rendered conductive so as to energize the warning lamp 12 by means of the D.C. source 3.

Therefore, the scene brightness by which a proper exposure cannot be effected by the shutter under the condition set at that time is detected by inspecting the lamp 12.

When it is desired to effect an exposure by the shutter described above, the switches 7, 14 are switched to the positions indicated by the dotted lines in FIG. 2 and the switch 4 is closed so as to discharge the capacitor 2. These operations can be coupled with the operation of the releasing means of the shutter. When the shutter is opened by the releasing means, the switch 4 is simultaneously opened by the coupling means well known in the art. Then, the capacitor 2 begins to be charged and the base voltage of the transistor 8 is lowered in accordance with the time constant of the circuit consisting of the capacitor 2 and the photoelectric element 1 the resistance of which is varied in response to the light intensity of the scene. And when the base voltage reaches the critical value $E_0$, the transistor 8 is made conductive thereby permitting the transistor 11 to be made conductive so that the electromagnet 13 serving as the shutter closing means is actuated so as to close the shutter. Thus, the proper exposure time is obtained.

A numerical example of the warning device of the present invention will be described below.

Assuming that the emitter voltage of the transistor 8 is set to the −2 v., while the terminal voltage of the D.C. source 3 is set to −8 v., the maximum shutter speed being $\frac{1}{200}$ sec., the capacity of the capacitor 2 being selected to be 1 μf. Then, the warning lamp 12 must be energized when the scene brightness requires a shutter speed higher than $\frac{1}{200}$ sec., because the maximum shutter speed is limited to $\frac{1}{200}$ sec. Under such a condition, the resistance of the photoelectric element 1 will be 17.4 kΩ. When the cycle of the A.C. of the A.C. source 15 is 50 c./s., the impedance of the capacitor 2 is 3.5 kΩ. Therefore, by making the voltage of the A.C. source 15 about 7 volts, it is possible to energize the lamp 12 under the condition in which the scene brightness exceeds the above described critical condition. The exact value of the voltage of the A.C. source 15 for the proper action of the warning device must be determined from the tests. However, this is easily be achieved by providing a fine adjustment resistor.

When a film of different sensitivity is used, the capacitor 2 is changed so as to properly respond to the sensitivity of the new film in a manner as described below.

Assuming, for example, that the capacity of the capacitor 2 is selected to be C 100 and the resistance of the photoelectric element 1 is R 100 under the above described critical condition in which a film having the sensitivity of ASA 100 is used, then the capacity of the capacitor 2 must be made 2C 100 for the proper action of the warning device in case a film having the sensitivity of ASA 50 is used in order to prolong the exposure time twice as long as that in case the film having the sensitivity of ASA 100 is used. Since a plurality of capacitors must be provided in an electronic shutter in order to make it possible to use the shutter for various films having different sensitivity, the above described interchange of the capacitor is achieved at the same time the electronic shutter per se is prepared for proper exposure in response to the sensitivity of the film to which the warning device is to be made to properly respond, thereby dispensing with the provision of additional capacitors for the warning device per se.

Assuming now that the above described critical value of the scene brightness is I 100 when a film having ASA 100 sensitivity is used, then the critical value of the scene brightness must be 2I 100 when a film of ASA 50 sensitivity is used. The resistance of the photoelectric element 1 will then be substantially R100/2 under the condition of the brightness of 2I 100, because the resistance of a photoelectric element is in inverse proportion to the light intensity incident to the photoelectric element. On the other hand, when the impedance of the capacitor 2 is Z100 under the condition in which a film of ASA 100 sensitivity is used, then the impedance will be Z100/2 when a film of ASA 50 film is used. This means that the ratio of the resistance of the photoelectric element to the impedance of the capacitor under the above described critical condition is kept constant regardless of the variation in the sensitivity of the film insofar as the capacitor is interchanged appropriately so as to correctly respond to the change in the sensitivity of the film used so that the warning lamp is properly energized.

The deviation of the change in the resistance of the photoelectric element from that in exact inverse proportion to the change in the light intensity incident thereto is little and can be practically neglected for the proper action of the warning device of the present invention.

As to the measures to reset the warning device so as to respond to a film of different sensitivity, the reference voltage of the control means, i.e. the emitter voltage $E_0$ can be varied by adjusting the resistors 9, 10.

In the above described embodiment, a warning lamp is shown. However, it is apparent to a person skilled in the art, that the warning lamp can be replaced by shutter arresting means 12′ (shown in phantom in FIG. 2) such as an electromagnet so as to lock the actuation of the shutter when the scene brightness is not appropriate for the proper exposure by the shutter thereby permitting the shutter to be positively prevented from being actuated under the inappropriate scene brightness. Otherwise stated, the arresting means will work for warning the operator against the false operation of the shutter prior to switching switches 7, 14 shown in FIG. 2.

It is evident that the transistor 8 may be replaced by any means such as a diode, vacuum bulb and the like insofar as it acts as a switching element.

Figure 3:
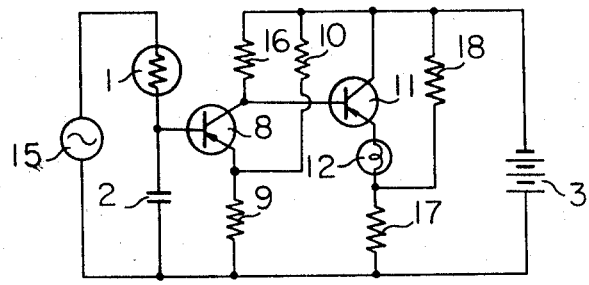
FIG. 3 is a view similar to FIG. 2 but showing a modification of the warning device of the present invention with the circuit of the electronic shutter being omitted for the clarification of the present invention.

FIG. 3 shows a modification of the warning device of the present invention in which the circuit for the electronic shutter is omitted for the simplicity of the showing.

In the embodiment of FIG. 3, a resistor 16 is added to the side of the collector of the transistor 8 as shown, while resistors 17, 18 as shown so as to set the emitter voltage of the transistor 11 so that the transistor 11 is rendered to be conductive when the light intensity is appropriate for the proper exposure by the shutter. Since the resistor 16 is added, the collector voltage of the transistor 8 is increased in the positive sense when the scene brightness is too high, so that the transistor 11 is rendered to be non-conductive. Thus, the current does not flow steadily through the transistor 11 and the lamp 12 is kept in non-energized state. When the scene brightness is in the range for the proper exposure by the shutter, the lamp 12 is energized.

Thus, the illumination by the light indicates that the scene brightness is appropriate for the proper exposure.

In case it is desired to completely extinguish the lamp when the scene brightness is too high for the proper exposure, it suffices that a smoothing circuit consisting of a resistor and a capacitor is added to the side of the base or the collector of the transistor 8, such being readily effected by a person skilled in the art.

The effect obtained by the embodiment of FIG. 3 can be achieved by reversing the connection of the photoelectric element and the capacitor in the embodiment of FIG. 2. In this case, the control of the exposure time is effected in such a manner that the switch 4 is connected in parallel with the capacitor 2 which has replaced for the photoelectric element 1 in FIG. 2. Thus, the voltage is varied in the positive sense when the switch is opened thereby permitting the current to be cut when the base voltage of the transistor 8 reaches the reference voltage so that the lamp is extinguished when the scene brightness reaches the critical value.

When the connection of the photoelectric element and the capacitor is reversed in the embodiment of FIG. 3, it is apparent that the lamp is energized when the scene brightness exceeds the critical value as in the case of the embodiment of FIG. 2.

Further, when an odd number of transistor stages is added to the amplifier circuit of the embodiment of FIG. 2 and a lamp is connected to the output of the amplifying circuit, the energization of the lamp is reversed from the lamp 12.

Further, it is apparent that the warning can be given when the scene brightness is too low for the proper exposure by appropriately adjusting the voltage of the A.C. source.

It is also possible to vary the voltage of the A.C. source appropriately by means of switching means so that the warning is given in either of the cases in which the scene brightness is too high or is too lower.

I claim:

1. A warning device in a photographic shutter capable of controlling the exposure time as a function of brightness of the scene to prevent improper exposure, comprising:

an A.C. source;
a D.C. source;
a timing circuit for said shutter; said A.C. source connected to the said timing circuit;
said timing circuit comprising a photoelectric element adapted to receive light from the scene and a capacitor connected in series with said photoelectric element for impressing on said timing circuit an A.C. voltage;
said photoelectric element having resistance variable in response to the variation in the scene brightness for generating an output;
a control means connected between one of the terminals of said A.C. source and the junction between said photoelectric element and said capacitor so as to be operated by the voltage applied thereto as determined by the resistance of said photoelectric element;
actuating means connected to said control means;
a warning means;
means to selectively connect said warning means to said D.C. source through said actuating means;
means to bias the control means so that energization of the actuating means occurs when a preselected threshold voltage is exceeded at the input of the control means thereby energizing the warning means;
said warning means providing a warning of improper exposure by the shutter after the resistance of said photoelectric element in response to the variation in brightness of the scene reaches a critical value associated with said threshold voltage,
and switching means for selectively connecting said A.C. source and said warning means to the shutter for effecting the warning at one position of the switching means and the automatic regulation of the exposure at another position thereof.

2. Warning device according to claim 1, wherein said warning means comprises indicating means connected in series with said actuating means for warning the improper condition of the shutter for the proper exposure.

3. Warning device according to claim 2, wherein said indicating means is a lamp.

4. Warning device according to claim 1, wherein said warning means comprises arresting means connected in series with said actuating means for preventing the shutter from being actuated for the improper exposure.

5. Warning device according to claim 1, wherein the shutter is an electronic shutter which comprises a D.C. source, a timing circuit connected to said D.C. source, and consisting of a photoelectric element and a capacitor connected in series to said D.C. source, control means connected to said D.C. source and the junction between said photoelectric element and said capacitor for generating an output depending upon the resistance of said photoelectric element which is variable in response to the variation in the scene brightness and actuating means connected to said D.C. source in series with a shutter closing means and connected to said control means so as to be supplied with said output of said control means so that the shutter is closed by means of said shutter closing means after the shutter is opened and said timing circuit is actuated for operating said control means for providing a proper exposure time to the shutter, and wherein said D.C. source, said controlling means and said actuating means are, respectively, utilized commonly as those of the warning device by switching the connected between either one of the terminals of said D.C. source and said timing circuit to one of the terminals of said A.C. source so as to complete the circuit including said A.C. source and said timing circuit and also by switching the circuit including said shutter closing means and said D.C. source so as to complete the circuit including said D.C. source and said warning means.

6. Warning device according to claim 1, wherein said control means comprises a transistor, the base of which is connected to the junction between said photoelectric element and said capacitor while the emitter of said transistor is connected to the junction between two resistors the opposite ends of which are connected to the respective terminals of said D.C. source so as to set a critical voltage of said emitter at which said transistor is made conductive when the voltage supplied thereto from said timing means reaches said critical voltage in response to the scene brightness, the collector of said transistor being connected to the base of a transistor constituting said actuating means, the emitter and the collector of said transistor constituting said actuating means being connected in series in the circuit including said D.C. source and said warning means, thereby permitting said transistor constituting said actuating means to be made conductive so as to actuate said warning means.

References Cited
UNITED STATES PATENTS

| | | | |
|---|---|---|---|
| 3,352,490 | 11/1967 | Dalzell et al. | 317—124 |
| 3,397,629 | 8/1968 | Mori et al. | 95—10 |
| 3,416,421 | 12/1968 | Biedermann et al. | 95—10 |
| 3,460,450 | 8/1969 | Ogihara | 95—10 |
| 3,464,773 | 9/1969 | Waz | 95—10X |

FOREIGN PATENTS

| | | | |
|---|---|---|---|
| 1,125,270 | 3/1962 | Germany | 95—10 |

SAMUEL S. MATTHEWS, Primary Examiner

M. L. GELLNER, Assistant Examiner

U.S. Cl. X.R.

250—214P; 317—130